(12) United States Patent
Nakamura

(10) Patent No.: US 6,453,409 B1
(45) Date of Patent: *Sep. 17, 2002

(54) DIGITAL SIGNAL PROCESSING SYSTEM

(75) Inventor: Kazuo Nakamura, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,564

(22) Filed: Nov. 6, 1997

(30) Foreign Application Priority Data

Nov. 7, 1996 (JP) .............................. 8-295454

(51) Int. Cl.$^7$ .............................................. G06F 15/00
(52) U.S. Cl. ........................ 712/35; 710/316; 710/317; 710/52; 710/53; 711/148; 712/20
(58) Field of Search ...................... 712/35, 20; 710/312, 710/305, 311, 316, 317, 52, 53; 711/148

(56) References Cited

U.S. PATENT DOCUMENTS

| | | | | |
|---|---|---|---|---|
| 5,239,654 A | * | 8/1993 | Ing-Simmons et al. | .. 395/800.2 |
| 5,313,587 A | * | 5/1994 | Patel et al. | ................... 710/20 |
| 5,345,566 A | * | 9/1994 | Tanji et al. | ................. 710/128 |
| 5,471,592 A | * | 11/1995 | Gove et al. | ................. 709/213 |
| 5,511,224 A | * | 4/1996 | Tran et al. | ................... 710/128 |
| 5,522,083 A | * | 5/1996 | Gove et al. | ............ 395/800.22 |
| 5,539,896 A | * | 7/1996 | Lisle | .......................... 711/150 |
| 5,740,386 A | * | 4/1998 | Miller et al. | ................ 710/128 |
| 5,790,839 A | * | 8/1998 | Luk et al. | .................... 710/128 |
| 5,801,975 A | * | 9/1998 | Thayer et al. | .............. 708/402 |
| 5,835,714 A | * | 11/1998 | Herzl et al. | .................... 10/110 |
| 5,835,742 A | * | 11/1998 | James et al. | ................ 710/130 |
| 5,867,726 A | * | 2/1999 | Ohsuga et al. | ......... 395/800.32 |

* cited by examiner

Primary Examiner—Hiep T. Nguyen
(74) Attorney, Agent, or Firm—Pillsbury Winthrop LLP

(57) ABSTRACT

A digital signal processing system has a control processor, a signal processor, and a plurality of memories. A signal processor carries out signal processing under control of the control processor. A connecting device connects each of the memories selectively to one of the control processor and the signal processor in response to an instruction from the control processor.

16 Claims, 4 Drawing Sheets

SELECTOR CONTROL SIGNAL

DIGITAL SIGNAL PROCESSING SYSTEM

BACKGROUND OF THE INVENTION

1. Field of the Invention

This invention relates to a digital signal processing system including a control processor and a signal processor for carrying out signal processing under the control of the control processor.

2. Prior Art

The DSP (Digital Signal Processor) is a dedicated processor for signal processing which is capable of carrying out multiplication and/or addition at a high speed. Recently, to realize a DSP capable of exhibiting an even higher level of function, there has been proposed a digital signal processing system of a multiple processor type which has a control processor connected to a DSP to thereby cause the DSP to carry out signal processing operations under the control of the control processor. FIG. 1 shows an example of the arrangement of a digital signal processing system of this kind which has a CPU (Central Processing Unit,) 1 as a control processor and a DSP 2 as a dedicated. signal processor. Further, a RAM (Random Access Memory) 3 is connected to the CPU 1 and a RAM 4 to the DSP 2, for storing control information and information for arithmetic operations supplied to and from the processors.

The illustrated digital signal processing system carries out various signal processing operations by the DSP 2 under the control of the CPU 1. Information (e.g. a program) for signal processing executed by the DSP 2 and signals to be processed by the same are supplied from the CPU 1 to the DSP 2.

To transfer data between the CPU 1 and the DSP 2, there are provided data-passing RAM's 5 and 6 between the CPU 1 and the DSP 2 whereby information required by the DSP 2 is supplied from the CPU 1 via these RAM's.

The conventional digital signal processing system is capable of carrying out various signal processing operations by using the DSP 2, as described above. A large amount of information is required to be transferred from the CPU 1 to the DSP 2, depending on the contents of the signal processing. However, the data-passing RAM's 5 and 6 are limited in their storage capacity, and if the whole data storage area of the data-passing RAM's 5 and 6 is occupied by data to be transferred between the CPU 1 and the DSP 2, new data cannot be transferred between the processors, impeding in the worst case smooth execution of the intended signal processing. Thus, the conventional digital signal processing system suffers from the problem that the kinds of signal processing that are executable are limited by the storage capacity of the data-passing RAM's. Further, if the conventional digital signal processing system suffers from a hitch in the data transfer as mentioned above, the processor sending out the data has to wait until at least one of the data-passing RAM's is made available, which degrades the efficiency of the whole system.

SUMMARY OF THE INVENTION

It is an object of the invention to provide a digital signal processing system which is capable of freely passing data between a control processor and a signal processor without being limited by the storage capacity of RAM's.

To attain the above object, according to a first aspect of the invention, there is provided a digital signal processing system comprising a control processor, a signal processor that carries out signal processing under control of the control processor, a plurality of memories, and a connecting device that connects each of the memories selectively to one of the control processor and the signal processor in response to an instruction from the control processor.

Preferably, when data are to be transferred from the control processor to the signal processor, the control processor causes the connecting device to connect one of the memories to the control processor to store the data in the one of the memories, then causes the connecting device to connect the one of the memories to the signal processor, and instructs the signal processor to start processing the data stored in the one of the memories, and if a remaining portion of the data is to be transferred from the control processor to the signal processor and at the same time another one of the memories is available after the instructing the signal processor, the control processor causes the connecting device to connect the another one of the memories to the control processor, and starts storing the remaining portion of the data in the another one of the memories.

Preferably, the digital signal processing system includes a first address bus and a first data bus both connected to the control processor, a second address bus and a second data bus both connected to the signal processor, and the connecting device comprises a first selector provided for each of the memories, for connecting each of the memories selectively to one of the first address bus and the second address bus, a second selector provided for each of the memories, for connecting each of the memories selectively to one of the first data bus and the second data bus, and a controller that delivers a selection instructing signal to the first selector and the second selector of each of the memories under control of the control processor.

More preferably, the first selector comprises a selector for upper places of an address and a selector for lower places of the address, the connecting device including an address decoder interposed between the selector for the upper places of the address and a corresponding one of the memories, the address decoder supplying a chip select signal to the corresponding one of the memories when an address supplied from the selector for the upper places of the address is indicative of the corresponding one of the memories.

Preferably, the memories comprise RAM's.

Preferably the memories comprise RAM's and ROM's.

More preferably, the digital signal processing system includes a plurality of I/O units, the connecting device including a third selector for connecting each of the I/O units selectively to one of the first address bus and the second address bus, and a fourth selector for connecting each of the I/O units selectively to one of the first data bus and the second data bus.

To attain the above object, according to a second aspect of the invention, there is provided a storage medium storing a program executable by a control processor of a digital signal processing system including the control processor, a signal processor that carries out signal processing under control of the control processor, and a plurality of memories, the program comprising a module for causing one of the memories to be connected to the control processor when data are to be transferred from the control processor to the signal processor, a module for causing the one of the memories to be connected to the signal processor after the data has been stored therein, a module for instructing the signal processor to start processing of the data stored in the one of the memories, and a module for, if a remaining portion of the data is to be transferred from the control processor to the signal processor and at the same time another one of the memories is available after the instructing the signal processor, causing the one of the memories to be connected to the control processor, and starting storing of the remaining portion of the data in the another one of the memories.

The above and other objects, features, and advantages of the invention will become more apparent from the following detailed description taken in conjunction with the accompanying drawings.

DETAILED DESCRIPTION

The invention will now be described in detail with reference to drawings showing an embodiment thereof.

Figure 2:
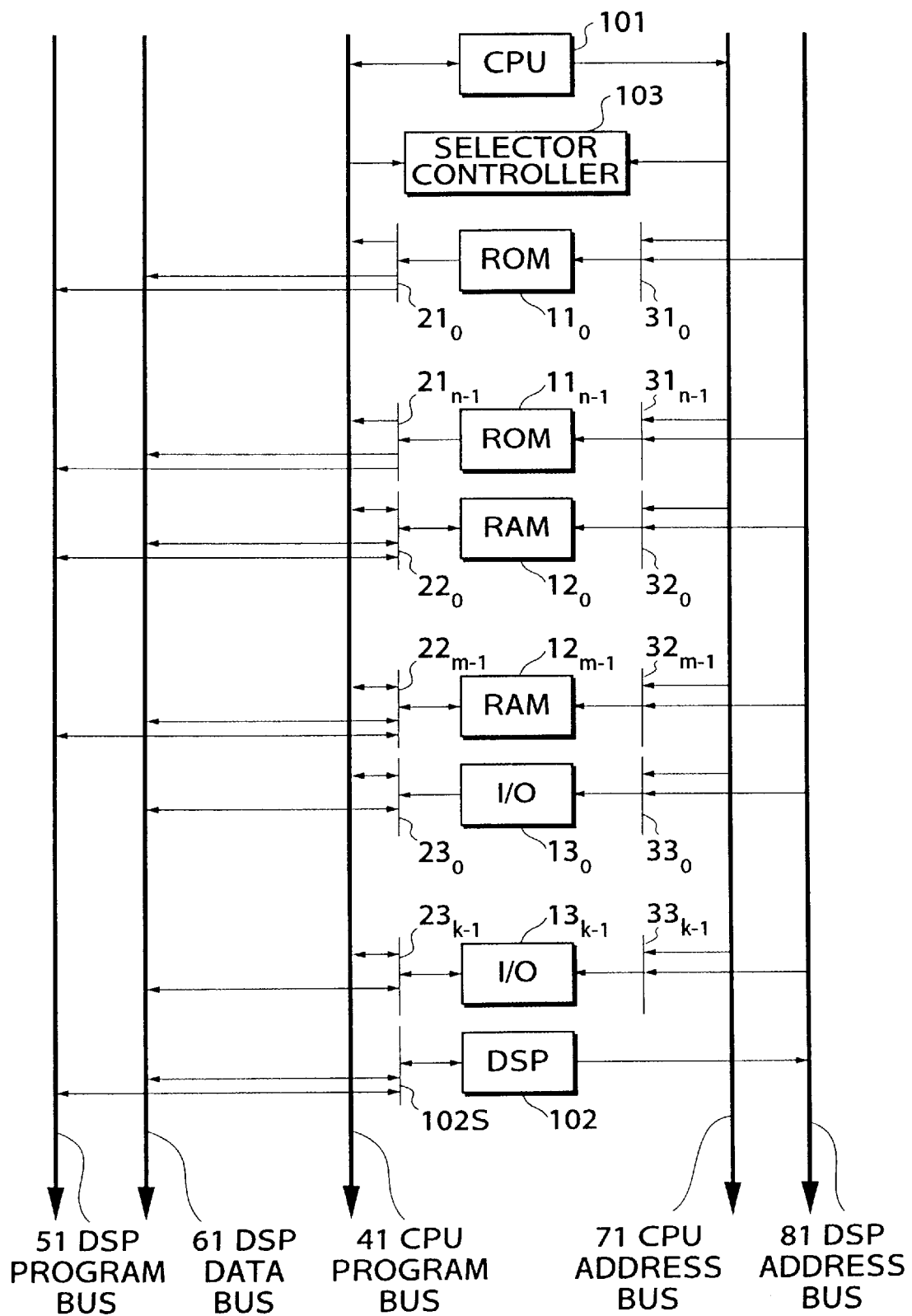
FIG. 2 is a block diagram showing the arrangement of a digital signal processing system according to an embodiment of the invention.

FIG. 2 shows the arrangement of a digital signal processing system according to an embodiment of the invention. The digital signal processing system according to the present embodiment includes a CPU 101 and a DSP 102, as well as n ROM's (Read Only Memories) $11_0$ to $11_{n-1}$, m RAM's $12_0$ to $12_{m-1}$, and k I/O units $13_0$ to $13_{k-1}$ which are used by the two processors 101 and 102.

Figure 1:
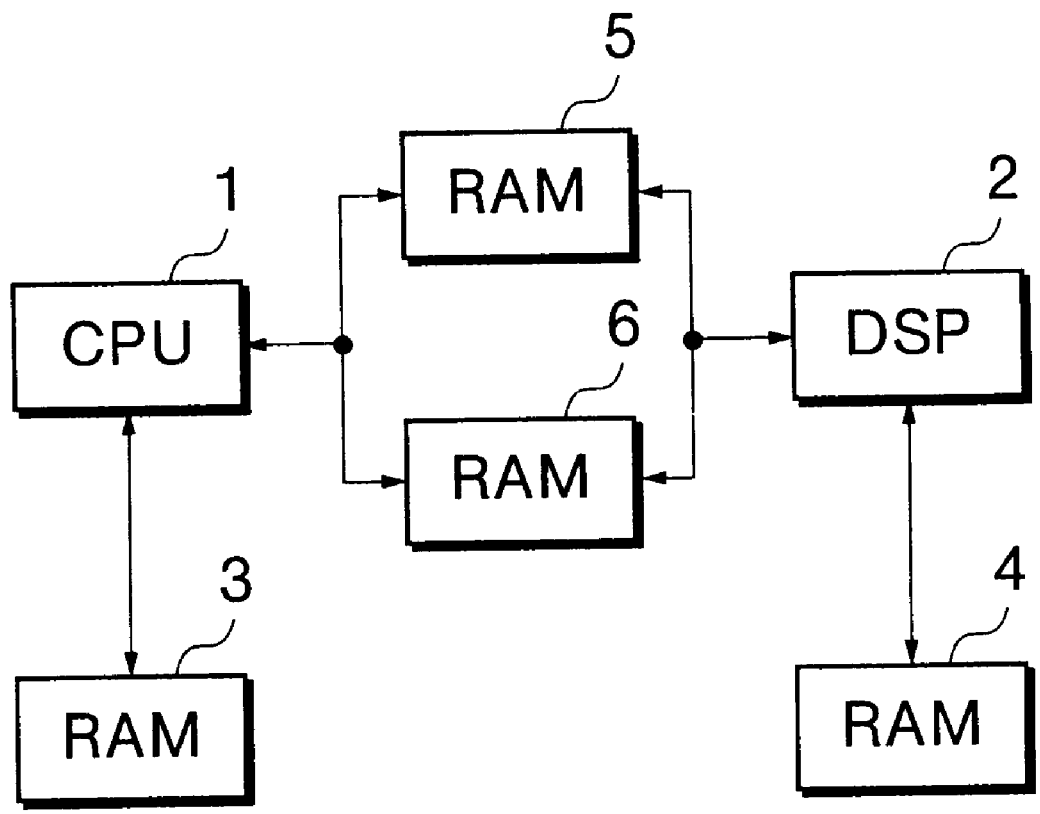
FIG. 1 is a block diagram showing the arrangement of a conventional digital signal processing system.

In the conventional digital signal processing system shown in FIG. 1, the RAM's play respective fixed roles peculiar thereto: the RAM 3 serves as a working RAM for the CPU 1, the RAM 4 as a working RAM for the DSP 2, and the RAM's 5 and 6 as data-passing RAM's for transfer of data between the CPU 1 and the DSP 2.

In contrast, in the digital signal processing system according to the present embodiment, the RAM's $12_0$ to $12_{m-1}$ do not play fixed roles peculiar thereto, but it is constructed such that they can change their roles as required, each serving as a working RAM for the CPU 101 on one occasion, as a working RAM for the DSP 102 on another occasion, or as a RAM for passing data between the CPU 101 and the DSP 102 on still another occasion.

Further in the present embodiment, it is also constructed such that the ROM's $11_0$ to $11_{n-1}$ and the I/O units $13_0$ to $13_{k-1}$ can also freely change their roles so as to increase the flexibility of the system.

In the present embodiment, a change of the role of each of the ROM's $11_0$ to $11_{n-1}$, the RAM's $12_0$ to $12_{m-1}$, and the I/O units $13_0$ to $13_{k-1}$ is carried out by changing the manner of connection between the same and the CPU 101 or the DSP 102. Next, the arrangement for changing the manner of connection will be described.

The CPU 101 is connected to a CPU program data bus 41 and a CPU address bus 71. When access is made to any of the RAM's, for example, the CPU 101 delivers an address of a desired location of the RAM to the CPU address bus 71 and transmits or receives data to or from the RAM via the CPU program data bus 41. The CPU 101 follows the same procedure when access is made to any of the ROM's and the I/O units. Further, the DSP 102 is connected to a DSP address bus 81, and to a DSP program bus 51 and a DSP data bus 61 via a selector 102S whereby when access is made to any of the RAM's, the ROM's, and the I/O units, the DSP 102 uses these buses 81, 51 and 61 to output an address and transmit or receive data or the like, similarly to the CPU 101.

As described above, the CPU 101 and the DSP 102 each use the buses provided in a manner corresponding thereto to make access to the RAM's, etc. In the present embodiment, for the ROM's $11_0$ to $11_{n-1}$, the RAM's $12_0$ to $12_{m-1}$, and the I/O units $13_0$ to $13_{k-1}$ which are accessed via corresponding ones of the buses, there are provided respective selectors $21_0$ to $21_{n-1}$, $22_0$ to $22_{m-1}$, $23_0$ to $23_{k-1}$ for selecting between the DSP data bus 61 and the DSP program bus 51, and respective selectors $31_0$ to $31_{n-1}$, $32_0$ to $32_{m-1}$, $33_0$ to $33_{k-1}$ for selecting between the CPU address bus 71 and the DSP address bus 81, as shown in FIG. 2. Further, a selector controller 103 operates under the control of the CPU 101 to supply selector control signals to these selectors separately to instruct to which bus the connection should be made, that is, to which of the CPU 101 and the DSP 102 should be connected each of the ROM's $11_0$ to $11_{n-1}$, the RAM's $12_0$ to $12_{m-1}$, and the I/O units $13_0$ to $13_{k-1}$.

Figure 3:
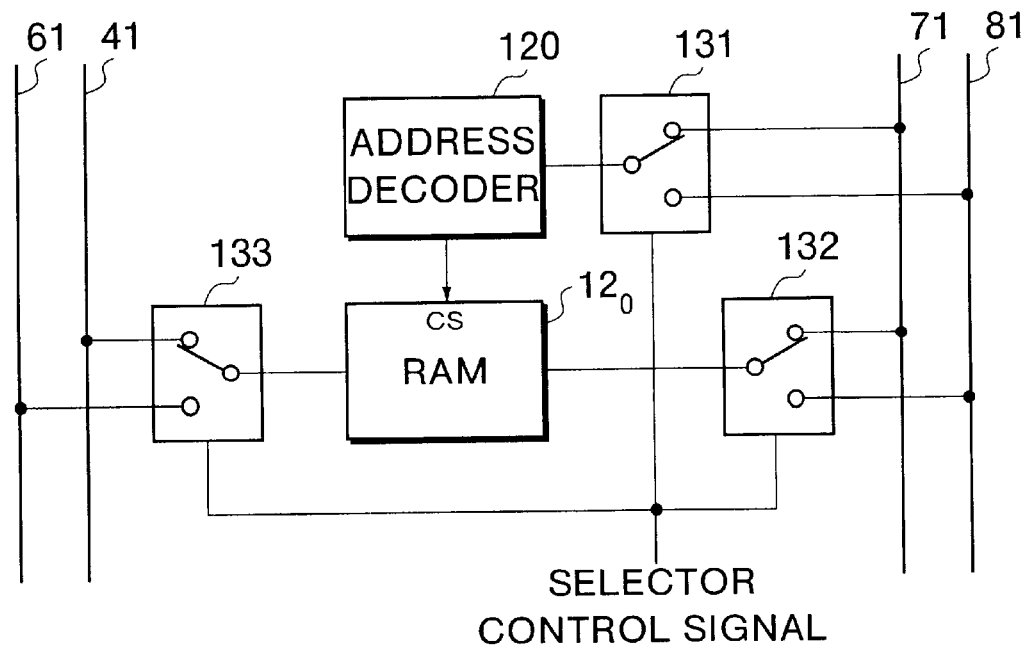
FIG. 3 is a block diagram showing the circuit configuration of a RAM appearing in FIG. 2 and component parts related to connection changeover control for the RAM.

FIG. 3 shows, by way of example, the circuit configuration of the RAM $12_0$ and component parts associated therewith for executing the connection changeover control. Each of the RAM's other than the RAM $12_0$, the ROM's and the I/O units also has a similar circuit configuration to the illustrated one.

In FIG. 3, selectors 131 and 132 correspond to the selector $32_0$ in FIG. 2. The selector 131 is for upper places of an address, while the selector 132 for lower places of the address. These selectors select the CPU address bus 71 or the DSP address bus 81 in response to a common selector control signal supplied from the selector controller 103 (shown in FIG. 2). Then, the selector 131 supplies the upper places of the address delivered to the selected address bus to an address decoder 120, whereas the selector 132 supplies the lower places of the address delivered to the same to an address terminal of the RAM $12_0$. If the upper places of the address supplied from the selector 131 corresponds to the RAM $12_0$, the address decoder 120 supplies a chip select signal to a chip select terminal CS of the RAM $12_0$.

On the other hand, a selector 133 is for delivering data read out from the RAM $12_0$ to the CPU program data bus 41 or the DSP data bus 61 in response to the above-mentioned address designation. The selector 133 forms a part of the selector $22_0$ in FIG. 2. The selector 133 has outputs for connection respectively to the CPU program data bus 41 and the DSP data bus 61, which are each formed by a three-state buffer. These buffers are set to high-impedance states when they do not deliver data such that they do not hinder data-delivering operations by other selectors connected to the same buses to which they are connected.

The selector 133 selects a bus to which output data thereof is to be delivered, in response to the same selector control signal as supplied to the selectors 131 and 132, and to this end the selector 133 is switched in a manner linked to the selectors 131 and 132. More specifically, if the CPU address bus 71 is selected by the selectors 131 and 132, the CPU program data bus 41 is selected by the selector 133, whereas if the DSP address bus 81 is selected by the selectors 131 and 132, the DSP data bus 61 is selected by the selector 133. Further, it should be noted that there is also provided a selector, not shown, for selecting either the CPU program data bus 41 or the DSP data bus 61 as a data bus from which data should be written into the RAM $12_0$.

Figure 4:
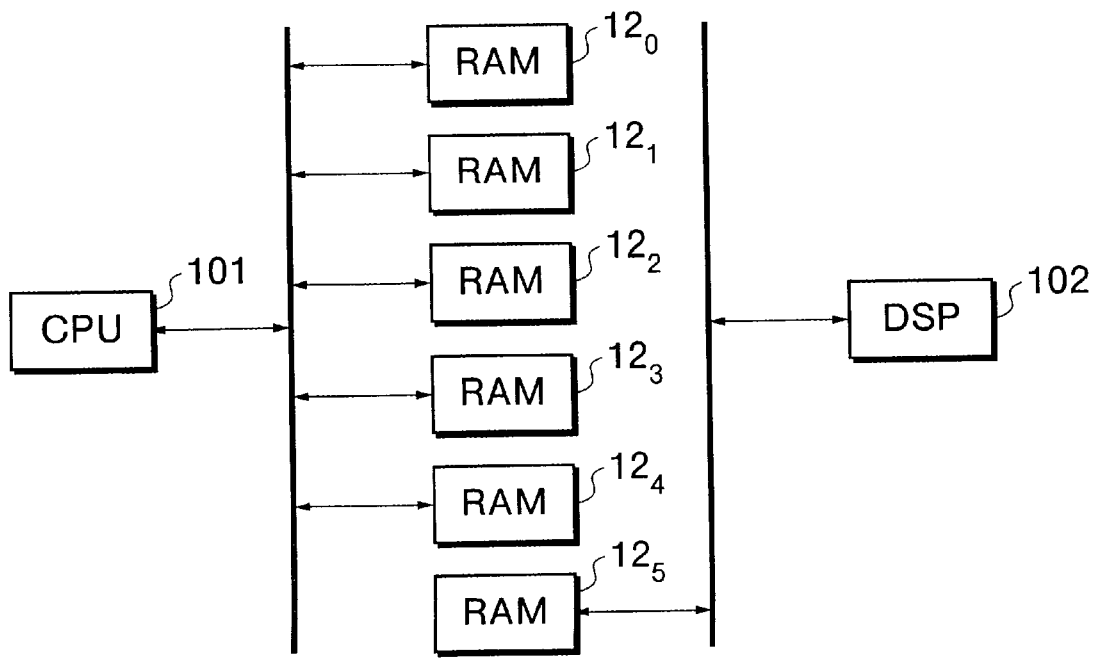
FIG. 4 is a diagram showing a state of the system during an example of signal processing operation executed by the digital signal processing system according to the embodiment.
Figure 5:
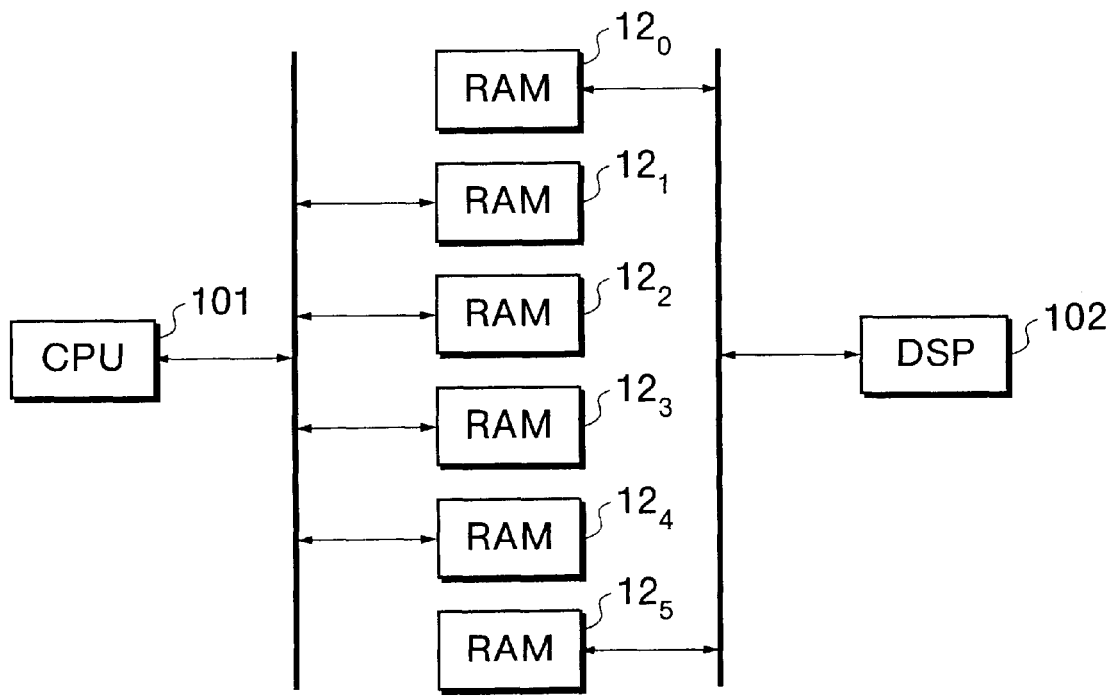
FIG. 5 is a diagram showing another state of the system during the example of signal processing operation.
Figure 6:
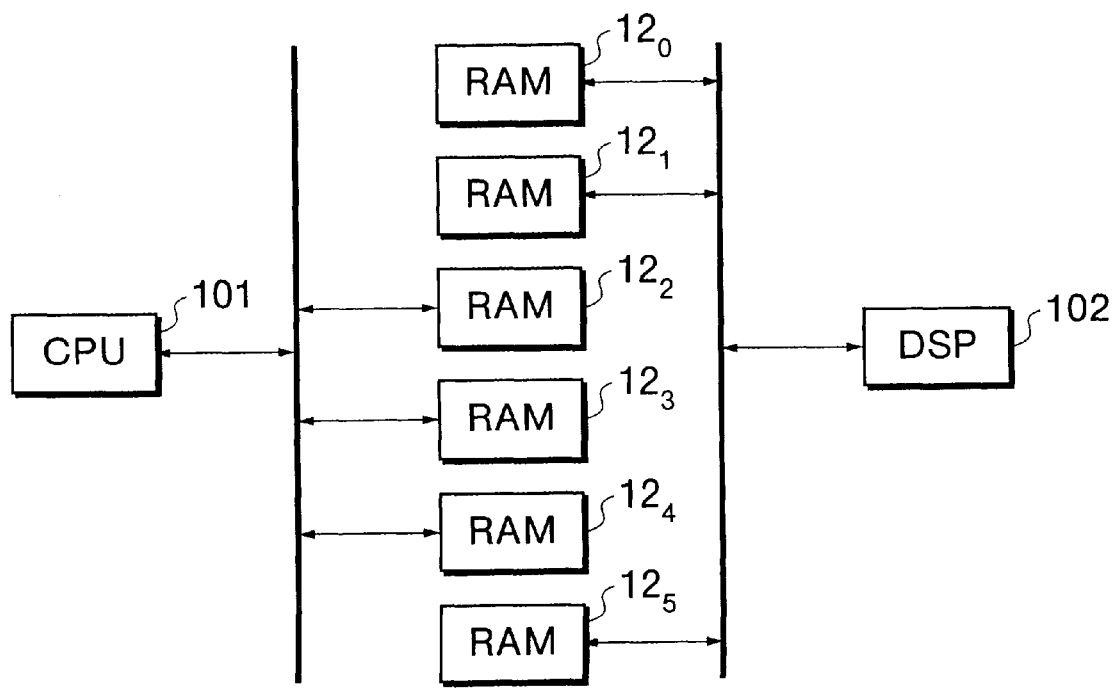
FIG. 6 is a diagram showing still another state of the system during the example of signal processing operation.

FIGS. 4 to 6 show an example of processing operation executed by the digital signal processing system according to the present embodiment. More specifically, FIGS. 4 to 6 show changes in the state of the connection between the CPU 101, the DSP 102 and the six RAM's $12_0$ to $12_5$ during the processing operation of the processor. Next, the processing operation according to the present embodiment will be described with reference to these figures.

In a state shown in FIG. 4, the RAM's $12_0$ to $12_4$ are connected by the selectors therefor to the CPU 101, while the RAM $12_5$ is connected by the selectors therefor to the DSP 102. In this example, the RAM's $12_4$ and $12_5$ are used as working RAM's by the CPU 101 and the DSP 102, respectively, whereas the RAM's $12_0$ to $12_3$ are used for passing data from the CPU 101 to the DSP 102.

First, the CPU 101 stores data to be transferred to the DSP 102 in the RAM $12_0$. When a predetermined amount of data has been accumulated in the RAM $12_0$, the CPU 101 causes the selector controller 103 (see FIG. 2) to carry out the above-mentioned changeover of the selectors, to thereby connect the RAM $12_0$ to the DSP 102, as shown in FIG. 5, and then instruct the DSP 102 to process data stored in the RAM $12_0$.

The DSP 102 starts processing the data stored in the RAM $12_0$ in response to the instruction, while the CPU 101 stores a remaining portion of the data to be transferred to the DSP 102 in the RAM $12_1$ during the processing of the data stored in the RAM $12_0$ by the DSP 102. And, when a predetermined amount of data has been stored in the RAM $12_1$, the CPU 101 causes the selector controller 103 to connect the RAM $12_1$ to the DSP 102, as shown in FIG. 6, and instruct the DSP 102 to process data stored in the RAM $12_1$.

If the data stored in the RAM $12_0$ has already been processed at this time point, the DSP 102 immediately starts processing the data stored in the RAM $12_1$ in response to the above instruction, whereas if the data stored in the RAM $12_0$ has not been completely processed yet, the DSP 102 holds the above instruction, and after the data in the RAM $12_0$ has been completely processed, the DSP 102 starts processing the data stored in the RAM $12_1$. The CPU 101, after instructing the DSP 102 to process the data in the RAM $12_1$ as described above, starts On operation for storing data to be transferred to the DSP 102 in the RAM $12_2$ regardless of whether or not the instructed data-processing is immediately started. Similarly, when the operation for storing data in the RAM $12_2$ has been completed, the CPU 101 instructs the DSP 102 to process the data in the RAM $12_2$, and thereafter, the CPU 101 starts an operation for storing data to be transferred to the DSP 102 in the RAM $12_3$ regardless of whether or not the instructed data-processing is immediately started. Thus, the operation by the CPU 101 is not hindered by the data-processing operation by the DSP 102, which enables the efficiency of the whole system to be improved.

Similarly, when the operation for storing data in the RAM $12_3$ has been completed, if the data in the RAM $12_0$ has already been processed by the DSP 102 at this time point, the CPU 101 starts an operation for storing data to be transferred to the DSP 102 in the RAM $12_0$, whereas if the data-processing has not been completed yet, the CPU 101 waits until the data-processing is completed to start storing the data in the RAM $12_0$. Hereafter, similar operations are repeatedly executed to thereby sequentially pass data from the CPU 101 to the DSP 102.

As can be understood from the illustrated examples of processing operation according to the present embodiment, it is possible to freely select the role of each RAM between a working RAM and a data-passing RAM for passing data to or from the CPU 101 or the DSP 102. Therefore, the storage capacity of the data-passing RAM's can be adjusted with ease, thereby enabling the DSP 102 to carry out various kinds of signal processing.

Further, in the present embodiment, not only the RAM's but also the ROM's and the I/O units can be connected to the CPU 101 or the DSP 102 as desired, which enables the signal processing control to be performed in a flexible manner.

The above described embodiment is illustrated only by way of example, and not by way of limitation, and can be modified as desired within the scope of the invention.

What is claimed is:

1. A digital signal processing system comprising:
   a control processor;
   a signal processor that carries out signal processing under control of said control processor;
   a plurality of memories which serve at least for data transfer between said control processor and said signal processor;
   a plurality of I/O units; and
   a connecting device that selectively connects each of said memories to one of said control processor and said signal processor in response to an instruction from said control processor and selectively connects each of said I/O units to one of said control processor and said signal processor in response to an instruction from said control processor.

2. A digital signal processing system according to claim 1, wherein when data are to be transferred from said control processor to said signal processor, said control processor causes said connecting device to connect one of said memories to said control processor to store said data in said one of said memories, then causes said connecting device to connect said one of said memories to said signal processor, and instructs said signal processor to start processing said data stored in said one of said memories, and if a remaining portion of said data is to be transferred from said control processor to said signal processor and at the same time another one of said memories is available after said instructing said signal processor, said control processor causes said connecting device to connect said another one of said memories to said control processor, and starts storing said remaining portion of said data in said another one of said memories.

3. A digital signal processing system according to claim 1, including a first address bus and a first data bus both connected to said control processor, a second address bus and a second data bus both connected to said signal processor, and wherein said connecting device comprises a first selector provided for each of said memories, for connecting said each of said memories selectively to one of said first address bus and said second address bus, a second selector provided for each of said memories, for connecting said each of said memories selectively to one of said first data bus and said second data bus, and a controller that delivers a selection instructing signal to said first selector and said second selector of said each of said memories under control of said control processor.

4. A digital signal processing system according to claim 3, wherein said first selector comprises a selector for upper places of an address and a selector for lower places of said address, said connecting device including an address decoder interposed between said selector for said upper places of said address and a corresponding one of said memories, said address decoder supplying a chip select signal to said corresponding one of said memories when an address supplied from said selector for said upper places of said address is indicative of said corresponding one of said memories.

5. A digital signal processing system according to claim 1, wherein said memories comprise RAM's.

6. A digital signal processing system according to claim 1, wherein said memories comprise RAM's and ROM's.

7. A digital signal processing system according to claim 3, wherein said connecting device includes a third selector for selectively connecting each of said I/O units to one of said first address bus and said second address bus, and a fourth selector for selectively connecting each of said I/O units to one of said first data bus and said second data bus.

8. A storage medium storing a program executable by a control processor of a digital signal processing system having a signal processor that carries out signal processing under control of said control processor, a plurality of memories which serve at least for data transfer between said control processor and said signal processor, and a plurality of I/O units, said program comprising:
   a module for causing one of said memories to be connected to said control processor when data are to be transferred from said control processor to said signal processor;
   a module for causing said one of said memories to be connected to said signal processor after said data has been stored therein;
   a module for instructing said signal processor to start processing of said data stored in said one of said memories;
   a module for, if a remaining portion of said data is to be transferred from said control processor to said signal processor and at the same time another one of said memories is available after said instructing said signal processor, causing said one of said memories to be connected to said control processor, and starting storing of said remaining portion of said data in said another one of said memories; and
   a module for selectively connecting each of said I/O units to one of said control processor and said signal processor in response to an instruction from said control processor.

9. A storage medium storing a program executable by a control processor of a digital signal processing system, wherein said control processor is coupled to a first bus, and said digital signal processing system includes a signal processor that carries out signal processing under control of said control processor, wherein said signal processor is coupled to a second bus, and having a plurality of memories which provide for data transfer between said control processor and said signal processor, and a plurality of I/O units, said program comprising:
   a module for causing one of said memories to be connected to said control processor when data are to be transferred from said control processor to said signal processor;
   a module for causing said one of said memories to be connected to said signal processor after said data has been stored therein;
   a module for instructing said signal processor to start processing of said data stored in said one of said memories;
   a module for, if a remaining portion of said data is to be transferred from said control processor to said signal processor and at the same time another one of said memories is available after said instructing said signal processor, causing said one of said memories to be connected to said control processor, and starting storing of said remaining portion of said data in said another one of said memories; and
   a module for selectively connecting each of said I/O units to one of either said control processor through said first bus, or to said signal processor through said second bus, in response to an instruction from said control processor.

10. A digital signal processing system comprising:
   a control processor;
   a first bus coupled to said control processor;
   a signal processor that carries out signal processing under control of said control processor;
   a second bus coupled to said signal processor;
   a plurality of memories which provide for data transfer between said control processor and said signal processor;
   a plurality of I/O units; and
   a connecting device that selectively connects each of said memories to one of either said control processor through said first bus or to said signal processor through said second bus in response to an instruction from said control processor and selectively connects each of said I/O units to one of either said control processor through said first bus or to said signal processor through said second bus in response to an instruction from said control processor.

11. A digital signal processing system according to claim 10, wherein when data are to be transferred from said control processor to said signal processor, said control processor causes said connecting device to connect one of said memories to said control processor to store said data in said one of said memories, then causes said connecting device to connect said one of said memories to said signal processor, and instructs said signal processor to start processing said data stored in said one of said memories, and if a remaining portion of said data is to be transferred from said control processor to said signal processor and at the same time another one of said memories is available after said instructing said signal processor, said control processor causes said connecting device to connect said another one of said memories to control processor, and starts storing said remaining portion of said data in said another one of said memories.

12. A digital signal processing system according to claim 10, including a first address bus and a first data bus both connected to said control processor, and a second address bus and a second data bus both connected to said signal processor, wherein said connecting device comprises a first selector provided for each of said memories, for connecting said each of said memories selectively to one of said first and said second address buses, a second selector provided for said each of said memories, for connecting said each of said memories selectively to one of said first and said second data buses, and a controller that delivers a selection instructing signal to said first selector and said second selector of said each of said memories under control of said control processor.

13. A digital signal processing system according to claim 12, wherein said first selector comprises a selector for upper places of an address and a selector for lower places of said address, said connecting device including an address decoder interposed between said selector for said upper places of said address and a corresponding one of said memories, said address decoder supplying a chip select signal to said corresponding one of said memories when an address supplied from said upper places of said address is indicative of said corresponding one of said memories.

14. A digital signal processing system according to claim 10, wherein said memories comprise RAMs.

15. A digital processing system according to claim 10, wherein said memories comprise RAMs and ROMs.

16. A digital signal processing system according to claim 12, including a plurality of I/O units, said connecting device including a third selector for connecting each of said I/O units selectively to one of said first and said second address buses, and a fourth selector for connecting each of said I/O units selectively to one of said first and said second data buses.

* * * * *